United States Patent [19]
Lubnin et al.

[11] Patent Number: 6,020,438
[45] Date of Patent: Feb. 1, 2000

[54] SUPPORTED VINYL CHLORIDE EMULSION (CO) POLYMERS AND PROCESS FOR MAKING THE SAME

[75] Inventors: Alexander V. Lubnin, Copley; John E. Fitzwater, Brecksville; Vic Stanislawczyk; Michael W. Topp, both of Strongsville, all of Ohio

[73] Assignee: The B. F. Goodrich Company, Richfield, Ohio

[21] Appl. No.: 09/094,243

[22] Filed: Jun. 9, 1998

[51] Int. Cl.$^7$ .................. C08F 259/04; C08F 259/06; C08F 14/00; C08F 14/16; C08F 114/16

[52] U.S. Cl. .................. 525/317; 524/457; 524/458; 524/460; 524/461; 524/527; 525/193; 525/330.7; 525/331.5; 525/333.3; 525/333.4; 525/902

[58] Field of Search ................. 525/317, 330.7, 525/331.5, 193, 333.3, 333.4, 902; 524/457, 458, 460, 461, 527

[56] References Cited

U.S. PATENT DOCUMENTS

| | | | |
|---|---|---|---|
| 3,433,724 | 3/1969 | Chapiro et al. | 204/159.17 |
| 4,151,143 | 4/1979 | Blank et al. | 260/29.6 |
| 4,179,417 | 12/1979 | Sunada et al. | 260/18 |
| 4,385,152 | 5/1983 | Boyack et al. | 524/460 |
| 4,465,803 | 8/1984 | Nakayama | 524/460 |
| 4,565,839 | 1/1986 | Nakayama | 524/458 |
| 4,820,762 | 4/1989 | Tsaur | 524/460 |
| 4,839,413 | 6/1989 | Kiehlbauch et al. | 524/460 |
| 4,845,149 | 7/1989 | Frazee | 524/458 |
| 4,867,313 | 9/1989 | Padovani | 206/519 |
| 4,876,313 | 10/1989 | Lorah | 525/281 |
| 4,879,333 | 11/1989 | Frazee | 524/460 |
| 4,879,364 | 11/1989 | Stanislawczyk | 526/318.2 |
| 4,916,171 | 4/1990 | Brown et al. | 523/161 |
| 4,983,426 | 1/1991 | Jordan, Jr. | 427/407.1 |
| 5,601,723 | 2/1997 | Kirk et al. | 210/701 |
| 5,763,012 | 6/1998 | Zhao et al. | 427/393.5 |

FOREIGN PATENT DOCUMENTS

| | | |
|---|---|---|
| 0338486 | 10/1986 | European Pat. Off. . |
| 0522791 | 1/1993 | European Pat. Off. . |
| 0627450 | 12/1994 | European Pat. Off. . |
| 0348565 | 3/1995 | European Pat. Off. . |
| 0727451 | 8/1996 | European Pat. Off. . |
| 42-24181 | 11/1967 | Japan . |
| 43-4869 | 2/1968 | Japan . |
| 47-3899 | 2/1972 | Japan . |
| 6925418 | 5/1969 | United Kingdom . |

OTHER PUBLICATIONS

Journal Chemical Society, vol. 70, 1948, pp. 538–542, Earl C. Chapin et al., "Copolymerization. IV. The Validity of the Tripolymer Equation for the Systems: Styrene–Vinyl Chloride–Methyl Acrylate and Styrene–Vinyl Chloride–Acrylonitrile".

European Polymer Journal, vol. 3, 1967, pp. 151–159, Aldolphe Chapiro et al., "Grafting of Acrylonitrile–Styrene Mixtures Onto Poly(Vinyl Chloride) by Using High–Energy Radiation".

American Chemical Society, Division Polymer Chemical, vol. 9, No. 1, 1968, pp. 668–674, G. Odian et al., "Monomer Reactivity Ratios in Radiation Graft Copolymerization".

Encyclopedia of Polymer Science and Engineering, $2^{nd}$ Edition, vol. 17, 1989, pp. 295–377, M.J. Bunten, "Vinyl Chloride Polymers, Polymerization".

Polymer Handbook, $3^{rd}$ Edition, J. Brandrup et al., pp. II/316 and II/319.

Abstract of High Energy Chemistry (Khim. Vys. Energ.), Ovchinnikov et al., 1982, vol. 16, No. 4, "Radiation Stability of Plasticized Modified Poly(Vinyl Chloride) Vinyl and Chloride Copolymers", pp. 326–330.

*Primary Examiner*—Patrick D. Niland
*Attorney, Agent, or Firm*—George W. Moxon II

[57] ABSTRACT

An emulsion polymer comprising as one of its components a graft copolymer of a residual aromatic monomer-free support resin polymer and a vinyl chloride (co)polymer is disclosed. The emulsion polymer is prepared using a two-stage process. In the first stage, a chasing monomer is reacted in the presence of a support resin polymer having at least one aromatic monomer to form an polymer which is free of residual monomer and has monomeric units derived from the aromatic monomer(s). In a second stage, the vinyl chloride emulsion (co)polymer is made in situ in a reaction mixture comprising the polymer which is free of residual monomer. An extensive grafting at the second stage yields a novel water dispersible graft copolymer containing both styrene and vinyl chloride.

40 Claims, 5 Drawing Sheets

SUPPORTED VINYL CHLORIDE EMULSION (CO) POLYMERS AND PROCESS FOR MAKING THE SAME

BACKGROUND OF THE INVENTION

1. Field of the Invention

This invention relates to emulsion polymers and a process for making the same. More particularly, the invention relates to a supported emulsion polymer comprised of a graft copolymer of aromatic support resin polymer and a vinyl chloride (co)polymer.

2. Description of the Prior Art

Supported (or fortified) styrene-acrylic emulsions are commonly used in paints, stains, floor polishes, leather treatment, cement formulations, architectural and paper coatings, and graphic arts. The latter includes printing inks and coatings for printing. A supported emulsion is the one in which an aqueous resin solution (the support) is used as a medium in which the second polymer is dispersed (mechanically or made in situ via polymerization to form an emulsion). The support resin adds stability to the emulsion, including both shear and freeze-thaw stability, keeps the emulsion particle size small, which is important for gloss and clarity, and aids the flow characteristics of the composition, including its leveling and redispersibility. Supported polymer emulsions are desirable in coatings and graphic arts due to the ease of use provided by the incorporation of solution resin into the polymer. Reference can be had to the following patent documents: M. Sunada et al., U.S. Pat. No. 4,179,417; W. J. Blank et al, U.S. Pat. No. 4,151,143; R. M. Boyack et al., U.S. Pat. No. 4,385,152; L. W. Lee et al., EP No. 0 338 486 A2 ; S.-L. Tsaur, U.S. Pat. No. 4,820,762 ; R. A. Kiehlbauch et al, U.S. Pat. No. 4,839,413; G. R. Frazee, U.S. Pat. No. 4,879,333; A. B. Brown et al., U.S. Pat. No. 4,916,171; R. Kuropka, EP No. 0 627 450 A1; and S. J. Chiou et al, EP No. 0 727 451 A2.

Typical prior art support resins are made from acrylic acid, methacrylic acid, maleic acid, styrene, alpha-methylstyrene, and various acrylate monomers. An emulsion polymer then is formed in the presence of the support resin by polymerizing acrylates, styrene, alpha-methylstyrene, and other like monomers. Further, di- and polyfunctional compounds often are used to chemically bind a support resin polymer to the particles of emulsion polymer. Examples of polyfunctional compounds include allyl-, methallyl-, vinyl-, and crotyl-esters of acrylic, methacrylic, maleic, fumaric and itaconic acids, or analogous amides, or analogous mercaptans. See, for example, European Patent Nos. EP 0 348 565 A1 or EP 0 522 791 A1; or U.S Pat. Nos. 4,565,839, 4,465,803, or 4,876,313.

Styrene and alpha-methylstyrene monomers are used in support resins because they impart gloss, flow and leveling, hardness and hydrophobicity to polymeric films, which are desirable attributes when making coatings and inks for paper, packaging, and graphic arts. Polystyrene has a glass transition temperature ($T_g$) of approximately 105° C. and is responsible for imparting gloss and hydrophobicity to certain graphic arts applications. In addition, as compared to acrylics, styrene creates a hard polymer. Alpha-methylstyrene is used for the same reasons as styrene, plus it provides for molecular weight control due to its low polymerization ceiling temperature.

It would be desirable, however, to synthesize a supported emulsion of a vinyl chloride (co)polymer for use in the graphic arts industry. Poly(vinyl chloride) has a lower $T_g$ (75 to 85° C. depending on tacticity) relative to polystyrene, and its presence is known to improve rub resistance and other abrasion properties useful in graphic arts applications. Further, vinyl chloride can provide better grease resistance, may improve adhesion to polyolefins, can be made into an ink or primer to accept an extrusion coat, and can lower the overall cost of an emulsion formulation, since abrasion enhancing additives such as waxes might not be required. Thus, it would be beneficial to synthesize an emulsion polymer having the attributes of both vinyl chloride (co) polymers as well as styrenic support resins.

It is well known in the prior art that styrenic monomers are poisonous to vinyl chloride polymerizations. Polymers derived from styrene, its derivatives, such as alpha-methylstyrene, and other aromatic monomers usually contain residual aromatic monomers and styrenic or other substituted aromatic unsaturation as end groups. For example, a gas chromatography analysis of typical, commercially available support resin indicates that there is from about 100 ppm to about 1500 ppm of unreacted styrenic monomers present in the support resin. Further, both types of unsaturation (free monomers and end groups) are poisonous to vinyl chloride polymerization. For example, in as early as 1948, Chapin, Earl C., Ham, George E. and Fordyce, Reid G., J. Chem. Soc., Vol. 70, p. 538 (1948) reported that a vinyl chloride-styrene copolymerization, containing 3.2 mole % styrene, could only achieve a 3.6 wt. % conversion after 340 hours. This means that the polymerization of vinyl chloride in the presence of styrene is greatly retarded and for all practical purposes is impossible to achieve.

Thus, a need exists for an emulsion polymerization process, and product formed thereby, wherein vinyl chloride can be (co)polymerized in the presence of a styrenic polymer without poisoning of the polymerization process. Particular challenge is represented by support resins made with the use of alpha-methylstyrene because the latter has low polymerization ceiling temperature of about 0–60° C. (J. Brandrup and E. H. Immergut, Polymer Handbook, 3rd Edn., p. II/316 and II/319). The low ceiling temperature makes a complete homopolymerization of alpha-methylstyrene impossible at elevated temperatures, unless some measures are taken.

BRIEF SUMMARY OF THE INVENTION

The present invention unexpectedly provides an emulsion polymer which is a copolymer of an aromatic (e.g., styrenic) support resin polymer and a vinyl chloride (co)polymer. Further, at least some part of the polymer is a graft copolymer of the vinyl chloride (co)polymer and the aromatic support polymer. The extensive in situ grafting unexpectedly provided additional benefit of eliminating the use of polyfunctional compounds which are generally used in order to achieve improved emulsion stability and redispersibility by chemical grafting of support resin with the emulsion polymer. See, for example, European Patent Nos. EP 0 348 565 A1 (1988) or EP 0 522 791 A1 (1992), or U.S. Pat. No. 4,867,313 (1989). The emulsion copolymer is aromatic (styrenic) monomer-free, colloidally stable, and redispersible. The terminology "residual aromatic monomer free" or "RAMF", as used herein, means that the support polymer in particular, and ultimately the copolymer emulsion, has essentially no traceable unreacted aromatic (e.g., styrenic) monomer residual.

The process for producing the vinyl chloride emulsion (co)polymer includes two stages which can be carried out separately or sequentially in the same reaction vessel. At the first stage, a support resin polymer having monomeric units derived from the aromatic monomer(s) and having residual aromatic monomer(s) and/or aromatic unsaturated end groups is treated with a radical initiator and a styrene-scavenging monomer to complete polymerization of unreacted aromatic monomer. For example, a commerical support resin was analyzed and found to contain about 300 ppm of unreacted styrene monomer. After the first stage reaction, the support resin was analyzed and found to contain no detectable residual aromatic monomers (<2 ppm). The styrene-scavenging monomer can be acrylic or other monomer or monomer mixture, which does not belong to the class of either aromatic or conjugated diene monomers. The scavenging monomer copolymerizes with residual aromatic monomer and/or end groups to yield an RAMF polymer. Advantageously, the polymer obtained at this stage forms seed particles for the second stage. Therefore, a various levels of surfactants can be added to a support resin solution before scavenging step to control particle size of the final supported emulsion product.

In a second stage, the vinyl chloride (co)polymer is formed in situ in a reaction mixture comprising the RAMF polymer obtained from the first stage. The resultant vinyl chloride emulsion (co)polymer is comprised of particles having an average diameter of as low as about 50 nm. Further, the vinyl chloride emulsion (co)polymer is redispersible in water.

Alternatively, instead of using presynthesized support resin, total polymer synthesis can be completed in one reaction vessel by the use of hydrosol technology. In particular, support resin can be synthesized as an emulsion and then neutralized with a base to yield a solution. This solution can be treated in the same reactor with a scavenging monomer and then vinyl chloride can be (co)polymerized to yield supported polymer emulsion.

Despite some advantages of hydrosol technique, the use of presynthesized support resin has a benefit of completely eliminating the possibility of cross-contamination of vinyl chloride and styrene monomer streams.

According to a first aspect of the invention, an emulsion polymer comprising a vinyl chloride (co)polymer and a support resin polymer is disclosed. The support resin polymer has monomeric units derived from at least one aromatic monomer and part of the support resin is grafted with the vinyl chloride (co)polymer. The resultant product contains graft copolymer and is redispersible in water and has a particle diameter less than about 500 nm.

According to a second aspect of the invention a polymerization process for preparing an emulsion polymer comprising a RAMF support resin polymer grafted with a vinyl chloride (co)polymer is disclosed. The process comprises the steps of (a) preparing a reaction mixture comprising an RAMF polymer having monomeric units derived from aromatic monomer(s) and (b) (co)polymerizing vinyl chloride in the reaction mixture from step (a).

According to a third aspect of the invention, a supported vinyl chloride emulsion (co)polymer is disclosed. The polymer is prepared by a process comprising the steps of: polymerizing at least one scavenging monomer in the presence of support resin polymer comprising at least one aromatic monomer, at least one functional monomer, and forming an RAMF polymer having monomeric units derived from the aromatic monomer(s); followed by (co) polymerizing vinyl chloride in a reaction mixture comprising the RAMF polymer.

Still other benefits and advantages of the invention will become apparent to those skilled in the art upon a reading and understanding of the following detailed specification.

DETAILED DESCRIPTION OF THE PREFERRED EMBODIMENT

The present invention relates to vinyl chloride supported emulsion (co)polymers and a process for making the same. More particularly, the vinyl chloride supported emulsion (co)polymer contains a graft copolymer of a support resin polymer having monomeric units derived from the aromatic monomer(s) and a vinyl chloride (co)polymer. In the process of the present invention, a support resin polymer having residual unreacted aromatic monomer(s) and/or aromatic unsaturation in the polymer chain, for example, in the form of end groups, is treated with a scavenging (chasing) monomer and initiator to form an RAMF polymer having monomeric units derived from the aromatic monomer(s). In a second stage, the vinyl chloride (co)polymer is formed in situ in a reaction mixture including the RAMF polymer.

The support resin comprises at least one aromatic monomer as a backbone monomer and at least one functional monomer. As used herein, a "backbone monomer" contains no polymerizable acid or derivatives thereof which can impart water solubility of the polymer. An "aromatic monomer" is a monomer containing carbon-carbon double bond in alpha-position to an aromatic ring such as styrene, alpha-methylstyrene, indene, acenaphthylene, vinylnaphtalene, vinylpyridine, and the like as well as their derivatives or mixtures thereof. The aromatic monomers are represented by the following formulae:

where n being an integer from 0 to 2; $R_1$, $R_2$, $R_3$, $R_4$, $R_5$, $R6$, and $R_7$ are selected from the group consisting of H, $CH_3$, $C_mH_{2m+1}$, OH, $OCH_3$, $OC_mH_{2m+1}$, COOH, $COOCH_3$, $COOC_mH_{2m+1}$, Cl and Br, m being an integer from 2 to 9, and $R_8$ is selected from the group consisting of H, $CH_3$, $C_mH_{2m+1}$, and $C_6H_5$, m being an integer from 2 to 9.

Suitable examples of aromatic monomers for practice in the present invention include alpha-methylstyrene (AMS), styrene (ST), tertiary butylstyrene, ortho-, meta-, and para-methylstyrene, ortho-, meta- and para-ethylstyrene, o-methyl-p-isopropylstyrene, p-chlorostyrene, p-bromostyrene, o, p-dichlorostyrene, o,p-dibromostyrene, ortho-, meta- and para-methoxystyrene, indene and its derivatives, vinylnaphthalene, diverse vinyl (alkylnaphthalenes) and vinyl (halonaphthalenes) and mixtures thereof, acenaphthylene, diphenylethylene, and vinyl anthracene.

The support resin polymer is an alkali or water-soluble polymer, which is capable of becoming a graft substrate for another polymer or capable of being grafted onto another polymer. The alkali soluble polymer comprises, as polymerized units, a sufficient amount of "functional monomer" to render the polymer alkali or water soluble. The terminology "functional monomer" is meant to denote any monomer or monomer combination providing the necessary acid or hydrophilic functionality, and includes acid-functional monomers, anhydride-functional monomers, salts thereof or a combination thereof. Acid functionality contributes substantially to film performance and assists in maintaining such desirable properties as film hardness, gloss, durability and controlled removability. Preferred functional monomers include, for example, acrylic acid, methacrylic acid, crotonic acid, vinylacetic acid, 2-acrylamido-2-methylpropanesulfonic acid, maleic acid, maleic anhydride, itaconic acid, mesaconic acid, fumaric acid, citraconic acid, alkali metal salts thereof and amine or ammonium salts thereof. Preferably, the functional monomer is an acrylic acid or methacrylic acid.

The support resin polymer can also preferably include, as polymerized units, other backbone monomers in addition to the aromatic monomers.

Specific examples of suitable backbone monomers include the following: (meth)acrylate esters such as methyl (meth)acrylate, ethyl (meth)acrylate, n-propyl (meth) acrylate, n-butyl (meth)acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, glycidyl (meth)acrylate, benzyl (meth)acrylate, allyl (meth) acrylate, 2-n-butoxyethyl (meth)acrylate, 2-chloroethyl (meth)acrylate, sec-butyl-(meth)acrylate, tert-butyl (meth) acrylate, 2-ethylbutyl (meth)acrylate, cinnamyl (meth) acrylate, crotyl (meth)acrylate, cyclohexyl (meth)acrylate, cyclopentyl (meth)acrylate, 2-ethoxyethyl (meth)acrylate, furfuryl (meth)acrylate, hexofluoroisopropyl (meth)acrylate, methallyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth) acrylate, 2-phenoxyethyl (meth)acrylate, 2-phenylethyl (meth)acrylate, phenyl (meth)acrylate, propargyl (meth) acrylate, tetrahydrofurfuryl (meth)acrylate, norbornyl (meth)acrylate, acrylamide and its derivatives, tetrahydropyranyl (meth)acrylate, isobutylene, diisobutylene, and tetraisobutylene. Some of the monomers listed above can impart water solubility even without using polymerizable acids.

Typical acrylate esters, which could be employed as the backbone monomer include methyl acrylate, ethyl acrylate, n-propyl acrylate, isopropyl acrylate, n-butyl acrylate, 2-ethylhexyl acrylate, and n-decyl acrylate.

Preferred monomer charges for the support resin polymer include the comonomer charges, such as alpha-methylstyrene and acrylic acid, the termonomers, such as styrene, alpha-methylstyrene and acrylic acid; and the tetramonomers such as styrene, alpha-methylstyrene, isopropyl acrylate, and acrylic acid. By preselecting an appropriate monomer and concentration of such monomer, the glass transition temperature, $T_g$, of the resulting polymer can be modified to provide a harder or softer polymer, as required. Monomers tending to yield "harder" polymers are common, for example, styrenic monomers, and $C_1$–$C_3$ alkyl methacrylates. Monomers tending to yield softer polymers include the acrylates and $C_4$ and higher methacrylates, such as n-butyl acrylate, 2-ethylhexyl acrylate and n-octyl acrylate.

Typical preferred alkali soluble copolymers for use as the support resin polymer of the present invention include vinyl toluene/acrylic acid, alpha-methylstyrene/acrylic acid, alpha-methylstyrene/methacrylic acid, and alpha-methylstyrene/maleic acid. Terpolymers include styrene/alpha-methylstyrene/acrylic acid, styrene/alpha-methylstyrene/methacrylic acid and alpha-methylstyrene/methyl methacrylate/acrylic acid. Tetrapolymers include, styrene/alpha-methylstyrene/ethyl acrylate/acrylic acid and styrene/alpha-methylstyrene/n-butyl acrylate/acrylic acid.

The preferred monomeric formulation for preparing the support resin polymer employs from about 5–90% by weight, preferably about 10–80% by weight aromatic monomer, from about 5–90% by weight, preferably about 10–60% by weight percent functional monomer; and from about 0–80% by weight, preferably 0–50% by weight of a backbone monomer other than an aromatic monomer. In the preferred embodiment, the support resin comprises a styrene/alpha-methylstyrene/acrylic acid copolymer in the ratio of about 1:1:2.

The support resins useful in the process of the present invention should be low molecular weight with a number average molecular weight in the range of from about 500 to about 50,000, preferably about from about 1,000 to about 25,000, and optimally from about 1,000 to about 5,000 g/mole.

Also, the support resin must be soluble or dispersible in an alkali solution or water. The support resin may have an acid number of from about 80 to about 1000, preferably about 180–250. When used herein, the term "acid number", when referring to the support resin, indicates the number of milligrams (mg) of potassium hydroxide required to neutralize one gram of resin.

Support resins may be produced by many processes known to those skilled in the art. Commonly employed processes include high temperature thermally initiated or free radically initiated bulk or solution polymerization, and emulsion polymerization.

The process for producing the vinyl chloride emulsion (co)polymer includes two stages which can be carried out separately or sequentially in one reaction vessel. At the first stage, a support resin polymer having monomeric units derived from the aromatic monomer(s) and having residual aromatic monomer(s) and/or aromatic unsaturated end groups is treated with a radical initiator and a styrene-scavenging monomer. In the second stage, the vinyl chloride (co)polymer is formed in situ in a reaction mixture comprising the RAMF polymer obtained from the first stage. Alternatively, instead of using presynthesized support resin, total polymer synthesis can be completed in one reaction vessel. In particular, support resin can be synthesized as an emulsion and then neutralized with a base to yield a solution. This solution can be treated in the same reactor with a scavenging monomer and then vinyl chloride can be (co) polymerized to yield supported polymer emulsion. The line-up of the stages in single reactor synthesis is not critical, provided scavenging step precedes vinyl chloride polymerization.

In a first stage of the process of the present invention, the support resin polymer is treated with an initiator and a chasing monomer, which acts as a scavenger so that any residual unreacted aromatic monomers and/or aromatic unsaturation in the support resin polymer are effectively forced into the formation of copolymers. The first stage results in the essentially aromatic monomer-free (RAMF) support resin.

As an additional advantage, at this stage, the seed latex is formed which allows for the particle size control of the final product.

The chasing monomer is any radically polymerizable monomer, which is not poisonous to vinyl chloride polymerization. The chasing monomer is of the general formula X—CH=CYZ where X is H, COOH; Y is H, $CH_3$, COOH, $CH_2COOH$; and Z is COOH, $COOCH_3$, $COOC_nH_{2n+1}$, $CONH(C_nH_{2n+1})$, $CON(C_nH_{2n+1})_2$.

Specific examples of chasing monomers suitable for practice of the present invention include methyl methacrylate, ethyl acrylate, butyl acrylate, 2-ethylhexyl acrylate.

In the first stage, the support resin polymer containing free aromatic monomer and/or aromatic unsaturated end groups and chasing monomer are reacted in the presence of initiator. The reaction temperature is selected based on the decomposition rate of the initiator. In this regard, the polymerization temperature of the first stage should be maintained at about 10–100° C., preferably 50–88° C., most preferably at about 76–86° C., if persulfate initiators are to be employed.

An initiator is added to the reaction mixture containing the support resin polymer to start the copolymerization of the chasing monomer and the residual aromatic monomer and/or aromatic unsaturation in the polymer. The initiator is preferably a persulfate initiator, most preferably sodium persulfate. Other initiators suitable for use in the first stage of the process would include ammonium persulfate, potassium persulfate, peroxides, azo compounds, and known redox initiators such as tert-butyl hydroxy peroxide/sodium formaldehyde sulfoxylate, for example. The initiator must be present in an amount sufficient to polymerize most of chasing monomer and is preferably present in an amount of 0.1–2% weight.

An emulsifier, typically an anionic emulsion polymerization surfactant such as, for example, sodium lauryl sulfate, can be used in an effective amount to promote emulsion polymerization, stabilize the reaction mixture and control particle size. Other emulsifiers, such as alkali metal alkyl or aryl sulfates, phosphates, sulfonates or sulfo succinic esters and nonionics, can also be utilized.

If the support resin contains an acid, the pH of the reaction mixture must be maintained at least about 6, and preferably at about 7.2–9.0. Aqua ammonia, amines or other bases may be used to adjust pH as necessary.

In a second stage of the polymerization process, the vinyl chloride (co)polymer supported emulsion is formed by the in situ (co)polymerization of vinyl chloride in the reaction mixture containing RAMF support resin. In this regard, vinyl chloride is polymerized or copolymerized in the reaction mixture to virtually a 100% conversion.

Preferably, the vinyl chloride (co)polymer is a major amount vinyl chloride and a minor amount any monomer(s), which is free-radically copolymerizable with vinyl chloride. The vinyl chloride (co)polymer is preferably 10–100 wt. % vinyl chloride and most preferably 40–100 wt. % vinyl chloride. Suitable comonomers would include any monomers capable of undergoing an emulsion polymerization. For example, any of the backbone monomers useful in the preparation of the support resin polymer (other than the aromatic monomers) would be suitable. The selection of the particular monomer is not critical to the present invention and will generally depend upon the properties sought for the application of the final polymer product. The selection of the monomer components to meet the desired application properties is well within the ordinary skill of the art of preparing emulsion polymerization.

Vinyl chloride is (co)polymerized using procedures known to those skilled in the art of emulsion polymerization [M. J. Bunten in: Encyclopedia of Polymer Science and Engineering, 2nd Edn., 1989, Vol. 17, p.295, H. F. Mark, N. M. Bikales, C. G. Overberger, and G. Mendes Edrs], the most notable difference being that vinyl chloride is (co) polymerized in a medium containing the RAMF support resin as opposed to a medium made up only of water and surfactant.

Initiation is an important factor in the emulsion polymerization process. Though common initiators suitable for emulsion polymerization may be used, persulfate initiators and, especially, ammonium or sodium persulfate are preferred. Other initiators would include potassium persulfate and redox systems. Mixtures or combinations or sequences of such initiators could also be employed.

Vinyl chloride can be introduced into reactor as a gas. Preferably it is introduced as a liquid under pressure. Both stages of the process can be carried out in a batch, semibatch, or continuous mode.

The polymerization temperatures are maintained within the temperature range used in the emulsion polymerization of vinyl chloride, 10° C.–90° C., preferably 40° C.–70° C., and most preferably 50° C.–60° C. To assist with heat removal and consumption of vinyl chloride, polymerization temperatures may be varied during the polymerization.

If desired, a post-addition of initiator may be employed to drive the reaction to completion. The choice of initiator, its amounts and effects would be apparent to one of ordinary skill in the art.

As noted earlier, the present emulsion polymer will contain some graft polymers which are a graft of the support polymer and the emulsion polymer. This will provide improved emulsion stability and redispersibility without the use of the typical polyfunctional compounds which are employed for this purpose. While not wishing to be bound, we hypothesize the following mechanism of grafting. It is initiated by the abstraction of methine hydrogen from the styrene or acrylic monomer unit by any free radical present in the reaction mixture. The macroradical thus formed will either combine with the growing chains of the vinyl chloride (co)polymer to yield a grafted polymer or become part of a new PVC chain. Either way, it leads to the formation of a graft copolymer which anchors the water soluble support polymer to the PVC surface. At the 9 to 20% level of grafting, it results in a very strong steric and electrostatic stabilization of the particles which is manifested in the excellent redispersibility of the centrifuged or dried latex.

Further understanding of the grafting mechanism can be had by referencing the following series of patents and articles, which explore another type of graft copolymers containing both vinyl chloride and styrene, namely, Yu. V. Ovchinnikov, S. V. Zhukova, A. M. Sharetskii, A. G. Kronman, Khim. Vys. Energ., Vol. 16(4), p. 326 (1982); A. C. Sturt, GB 69–25418 (1969); G. Odian and R. L. Kruse, Polym. Prepr., Am. Chem. Soc., Div. Polym. Chem., Vol. 9(1), p. 668 (1968); A. Chapiro and A. M. Jendrychowska-Bonamour, U.S. Pat. No. 3,433,724 (1969); S. Watanabe, I. Ito, T. Nomura, A. Higasa, JP 43004869 B4 (1968); T. Yoshitake and I. Kiyokazu, J P 42024181 B4 (1967); A. Chapiro and G. Palma, Eur. Polym. J., Vol. 3(1), p. 151 (1967). In these publications the graft polymers are usually made by inverse procedures, such as where styrene (co) monomer is polymerized in the presence of presynthesized PVC. None of these publications suggest making vinyl chloride (co)polymer emulsion supported with a alkali/water soluble aromatic copolymer, which could be useful for the graphic arts applications. N. Koyanagi [JP 47003899 B4 (1968)] describes a thermoplastic composition made by grafting vinyl chloride onto styrene-acrylonitrile copolymer. Thus, the process of the present invention would appear to result in a new composition.

The process of the present invention provides an aqueous emulsion of supported vinyl chloride (co)polymer. The aqueous emulsion is generally from 20 to 60% by weight solids, preferably from about 30 to 55% by weight solids. The percentage of total solids the support resin represents in the final emulsion is from about 5 to about 70% by weight and preferably from about 10 to about 60% by weight.

The viscosity of the aqueous emulsion of the present invention is from about 10 to about 10000 centipoises (cP), more preferably from 200 to 1000 cP at the more preferred level of polymer solids.

The pH of the reaction mixture must be maintained at at least about 6, and preferably at about 7.2–9.0.

The emulsion (co)polymer of the present invention has an average particle size (diameter) less than 500 nm, more preferably less than 200 nm, most preferably less than 150 nm. The particle sizes, as reported herein, are diameters as measured by Submicron Particle Sizer Autodilute Model 370.

The emulsion (co)polymers of the present invention are useful in the form of an aqueous emulsion and as a dried polymer powder such as a polymer powder prepared by spray drying. The emulsion polymers of the present invention are redispersible in water making them useful in many applications. More particularly, the applications would include, but are not limited to, overprint varnishes, and coatings and inks used in the graphic arts industry and coatings industry, including, inks, overprint varnishes, and coatings for paper, texctiles, leather, metal, wood, plastics, multi wall bags, folding cartons, corrugated boxes, general lithographic printing and flexible packaging, floor waxes, paper saturants, architectural and industrial paints and sprayable coatings for non-wovens. Methods of application would include saturation, roller coating, spraying, brushing, flexography, rotogravure and other processes known to those skilled in the art for the manufacture of these goods.

The present invention will now be described in greater detail in the following examples.

EXAMPLE 1

(Example Using n-butyl Acrylate Comonomer)
First Stage

A three-liter pressure rated stainless steel stirred reactor containing 57 grams demineralized (DM) water; 32 grams 30 wt. % sodium lauryl sulfate (SLS); 9 grams sodium persulfate (SPS); 29 grams n-butyl acrylate; and 970 grams 32 wt. % solution of support resin Carboset™ GA 1160 (commercially available from The B. F. Goodrich Company) was heated to 82° C. and held for two hours.
Second Stage After cooling the reactor down to 52° C. and adding a solution made from 38 grams DM water; 19 grams ammonium persulfate (APS); and 14 grams 28 wt. % aqua ammonia, the following components were metered into the reactor over a period of 14 hours: 800 grams vinyl chloride; 125 grams n-butyl acrylate; and a mixture containing 394 grams DM water and 7 grams 28 wt. % aqua ammonia. The residual monomers were polymerized by addition of 3 grams APS dissolved in 14 grams DM water. The reactor was held at 65° C. for 4 hours during the polymerization of the residual monomers. The last traces of monomers were polymerized by metering simultaneously two solutions of redox chaser over a period of 4 hours at 75° C. The solution of oxidizing component was prepared by mixing 10 grams t-butyl hydrogen peroxide with 38 grams DM water and the solution of the reducing agent was prepared by dissolving 14 grams sodium formaldehyde sulfoxylate in 114 grams DM water. Alternatively, residual vinyl chloride can be removed from the latex by applying vacuum.

The emulsion polymer obtained had 49 wt. % total solids as measured by Moister/Solids Analyzer LabWare 9000™ (CEM Corporation), a glass transition temperature ($T_g$) of 63° C., a pH of 8 as measured by Acumet Basic pH Meter (Fisher Scientific), 1100 cP Brookfield viscosity as measured at 60 rpm by Brookfield Viscometer (Brookfield Engineering Laboratories, Inc.), and 100 nm particle size as measured by Submicron Particle Sizer Autodilute$^{PAT}$ Model 370 (NICOMP Particle Sizing Systems).

EXAMPLE 2

(Example Using Ethylacrylate)

As supported emulsion polymer was prepared in a manner identical to Example 1 with the exception that the following components were used at the specified temperatures and time periods:
First Stage (82° C., 2 hrs.)

550 grams demineralized (DM) water; 60 grams 30 wt. % SLS; 10 grams 28% aqua ammonia, 19 grams SPS, 19 grams ethyl acrylate, and 970 grams 32 wt. % solution of support resin Carboset™ GA 1160;
Second Stage (57° C., 25 hrs.)

143 grams DM water, 19 grams APS, and 10 grams 28 wt. % aqua ammonia. Metered: 800 grams vinyl chloride, 125 grams ethyl acrylate, and mixture of 143 grams DM water and 12 grams 28 wt. % aqua ammonia. Pressure during polymerization varied between 110 and 130 psig. After polymerization was completed, residual monomers were polymerized with the use of a residual monomer reduction package described in Example 1.

The emulsion polymer obtained had 45 wt. % total solids, pH=8.5, 60 cP Brookfield viscosity, and 56 nm particle size.

EXAMPLE 3
(Example of a Process Without a Scavenging Step)

A three-liter pressure stainless steel stirred reactor containing 660 grams DM water; 37 grams 30 wt. % SLS, 11 grams SPS; and 1120 grams 32 wt. % support resin Carboset™ GA 1160 was heated to 52° C. and 275 grams vinyl chloride were metered into the reactor over a period of 5 hours. After holding the reactor at polymerization temperature for additional 5 hours, no reaction was observed (no pressure drop). The charge had to be terminated, and vinyl chloride had to be vented.

EXAMPLE 4
(Example of Vinyl Chloride Homopolymer)

Using the process as set out in Example 1 for the first stage of the polymerization process and the process as set out in Example 3 for the second stage, a supported emulsion polymer was prepared with the use of the following components:

First Stage (83° C., 2 hrs.)

600 grams DM water, 37 grams SLS (30 wt. %), 11 grams SPS, 33 grams n-butyl acrylate, and 1120 grams 32 wt. % solution of support resin Carboset™ GA 1160.

Second Stage (52° C., 5 hrs.)

44 grams DM water, 11 grams SPS, and 8 grams 28 wt. % aqua ammonia. Metered: 275 grams vinyl chloride and a mixture of 110 grams DM water and 16 grams 28 wt. % aqua ammonia. After polymerization was completed, residual monomers were polymerized with the use of a residual monomer reduction package.

The emulsion polymer obtained had pH=8.8 and 74 nm particle size.

EXAMPLE 5
(Comparison with Blended Composition)

A support resin solution was blended with a commercial Vycar 460X46 vinyl chloride emulsion polymer in a proportion of 25:75 weight percent. The obtained blend was tested side by side with a supported emulsion polymer prepared in a manner similar to Example 1, albeit on a larger scale.

A) Emulsion Polymer Stability

Both Emulsion polymers were placed in a 60° C. oven. The blended emulsion polymer showed first sign of sedimentation after three days, i.e., a clear layer formed at the top of the emulsion polymer. The emulsion polymer of the present invention was stable after 6 months in the oven.

B) Redispersability

Both emulsion polymers were dried at ambient temperature for three days. The dry polymers were placed in 2.5 wt. % aqua ammonia and stirred with magnetic stirrers. The blended emulsion polymer did not go back into emulsion and the polymer remained in the form of original dry pieces. The supported emulsion polymer of the present invention went back into stable emulsion within a half-hour.

EXAMPLE 6
(Evaluation of use as GA Product)

The emulsion polymers of Examples 1, 2 and 4 were tested for suitability as a graphic arts polymer in the following tests:

A. Both the emulsion polymer of Examples 1 and 2 and a standard graphic arts polymer were coalesced and applied to a coated board substrate at equivalent film solids. The polymers were then read for gloss using an Byk-Gardner Micro-Tri-Gloss Meter reading the reflected light at a 60° angle. The standard graphic arts polymer yielded a reading 58.2%, while the emulsion polymer of Example 1 read 63.5%. The readings were within the tolerance of the instrument and application method to be considered equivalent.

B. Both coalesced lattices were then applied to aluminum foil and dried in a forced air oven at 250° F. for two minutes. These samples were then subject to a water spot test where drops of demineralized water were placed on the polymer film and removed at 1, 3 and 5 minutes by blotting with an absorbent paper towel. The emulsion polymer film was then examined for whitening, blistering or removal. The emulsion polymer of Example 1 was deemed to yield acceptable results.

C. Both the emulsion polymer of Example 1 and the standard graphic arts polymer were made into simple inks by mixing 50 wt. % polymer and 50 wt. % commercial pigment dispersion. The inks were then applied to a coated board and then subjected to 100 rub cycles on a "Sutherland Rub Tester" using a four pound weight. The emulsion polymer of Example 1 was judged to be clearly superior.

D. Prints made on coated paper were then subjected to a industry standard "grease proof" test. The polymer of this invention was judged to be clearly superior.

EXAMPLE 7
(Polymer characterization)
GPC with Dual RI and UV Detection.

Figure 1:
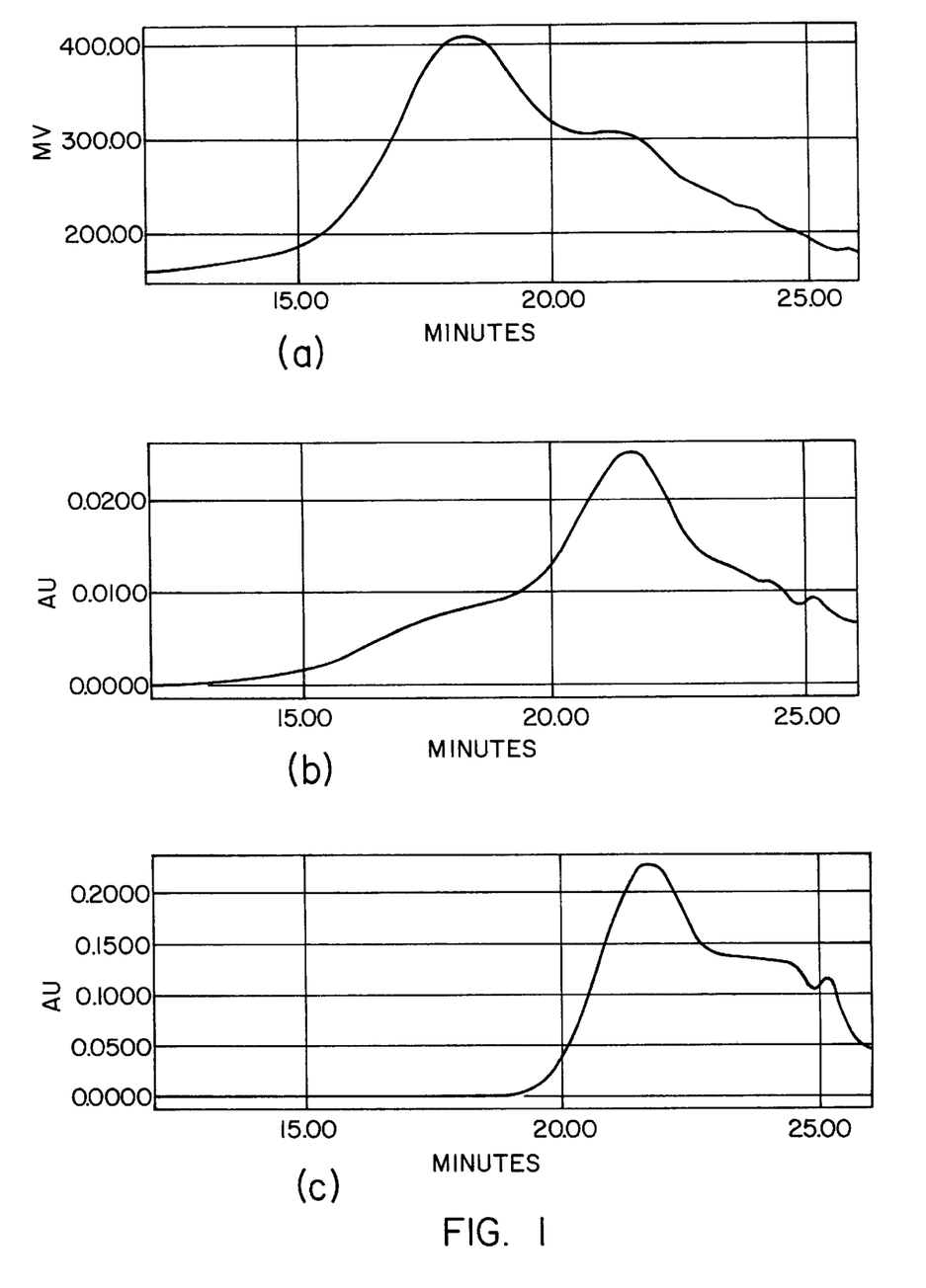
FIG. 1 is a series of GPC traces showing the graft copolymer of the present invention via a refractive index (RI) detector and an ultraviolet (UV) detector, and the support resin via a UV detector.

FIG. 1 shows the GPC traces of supported poly(vinyl chloride-co-n-butyl acrylate) latex from example 1 obtained with the refractive index (trace a) and UV (trace b) detectors. The following chromatographic conditions were used for collecting the GPC data: Mobile phase—THF, pump—Waters 510 LC pump at 1.0 ml/min, autosampler—Micromeritics Model 72, sample concentration ~0.15%, 100 ml injection volume, column set—Phenogel, 2× Linear (2)+50 A columns, all 5 micron, in series, column temperature 30° C. The data for analysis was acquired using Waters' Millennium LC/GPC network software, version 2.15. The molecular weight calibration curve was established with EasiCal polystyrene standards from Polymer Laboratories. The unimer with molecular weight 162 was added. The calibration curve covered a molecular weight range of 162 to 8.5×160 Daltons.

The refractive index trace corresponds with the overall molecular weight distribution while the UV trace gives the distribution of the UV-active components only. In this case, the UV-active component is an aromatic ring of styrenic monomers in support resin. Two main modes are clearly seen in both RI and UV traces. Comparison with the GPC trace of original support resin (FIG. 1c) indicates that the low molecular weight (longer retention time) mode is due to the free GA-1160. The higher molecular weight (shorter retention time) mode is due to the vinyl chloride copolymer. FIG. 1b clearly shows that the PVC fraction is also UV active. Since the vinyl chloride copolymer is transparent for the 254 nm light used in the UV detector, the UV absorbance of the PVC fraction is most likely due to the grafting of the UV-active support resin with the PVC copolymer. In order to prove this, the supported latex was fractionated as described below.

Fractionation

To isolate the grafted from the free support resin, 20 g latex was diluted with 80 mL water, centrifuged for 1 hour at 30,000 rpm, and water phase was decanted. Yellow transparent gel collected from the bottom of centrifuge tubes was redispersed in 100–150 mL DM water and centrifuged again for 2 hours at 30,000 rpm. This cycle was repeated 6 times in total. The following table summarizes the results.

| Wash No. | Resin recovered from the water phase, g | PH of the water phase |
| --- | --- | --- |
| 1 | 2.85 | — |
| 2 | 0.23 | 9.1 |
| 3 | Trace | 9.2 |
| 4 | 0 | 9.4 |
| 5 | 0 | — |
| 6 | 0 | 7.7 |

Figure 2:
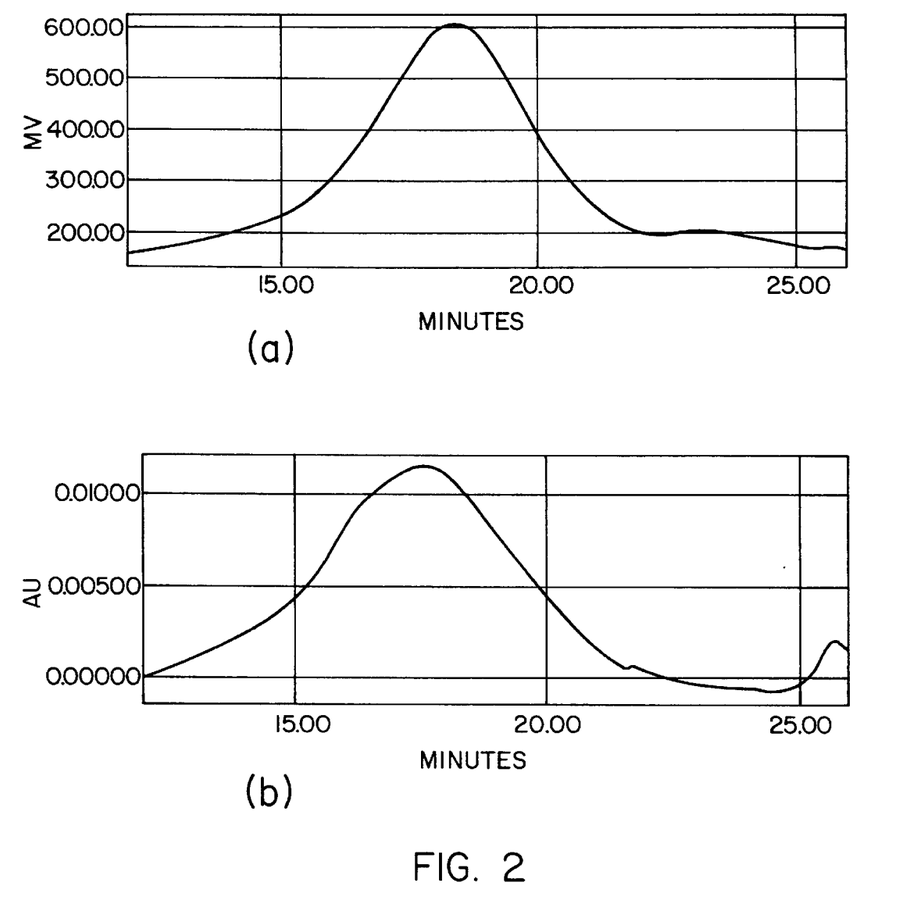
FIG. 2 is a series of GPC traces via RI and UV detectors of the isolated poly(vinyl chloride) (PVC) fraction (Example 7) of the polymer of the present invention formed in Example 1.

It is interesting to note that, unlike other vinyl chloride latexes, polymer was completely redispersible in water during this cycles, and only after sixth centrifugation, some polymer remained as non-redispersible coagulum. To remove free GA 1160 which could be occluded inside the particles, polymer obtained after sixth centrifugation was dissolved in THF and precipitated into methanol. Precipitated polymer was dried in the oven at 60° C. for 3 days. The GPC analysis indicated that the isolated PVC fraction did not contain free support resin (FIG. 2): Both RI and UV traces contain the high molecular weight mode only (compare with FIG. 1). The isolated PVC fraction was analyzed by an array of spectroscopy methods.

UV Spectroscopy

Figure 3:
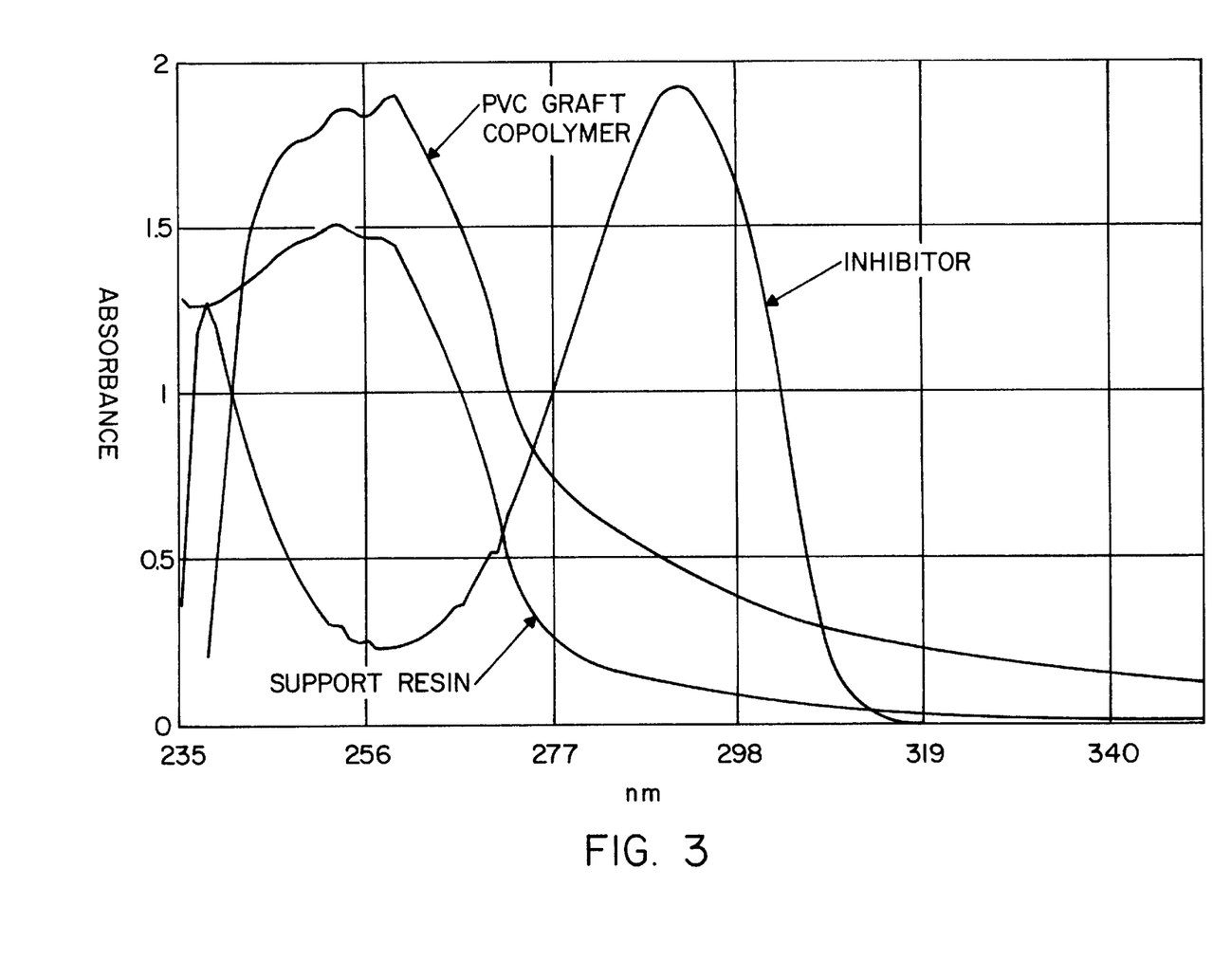
FIG. 3 is a series of UV spectra of the isolated PVC fraction (Example 7) of the polymer of the present invention, the support resin, and the monomer inhibitor (methyl ether of hydroquinone).

The UV spectra of the isolated PVC fraction and the support resin GA 1160 are shown on FIG. 3. The UV spectrum of methyl ether of hydroquinone (MEHQ), which is used to stabilize monomers, is also included to make sure the UV activity of the polymer is not due to the grafting of inhibitor. From the visual comparison of the three UV spectra, it is clear that the UV absorption of PVC fraction is due to the chemically bonded GA1160 which confirms the hypothesis of grafting.

Infrared Spectroscopy

Figure 4:
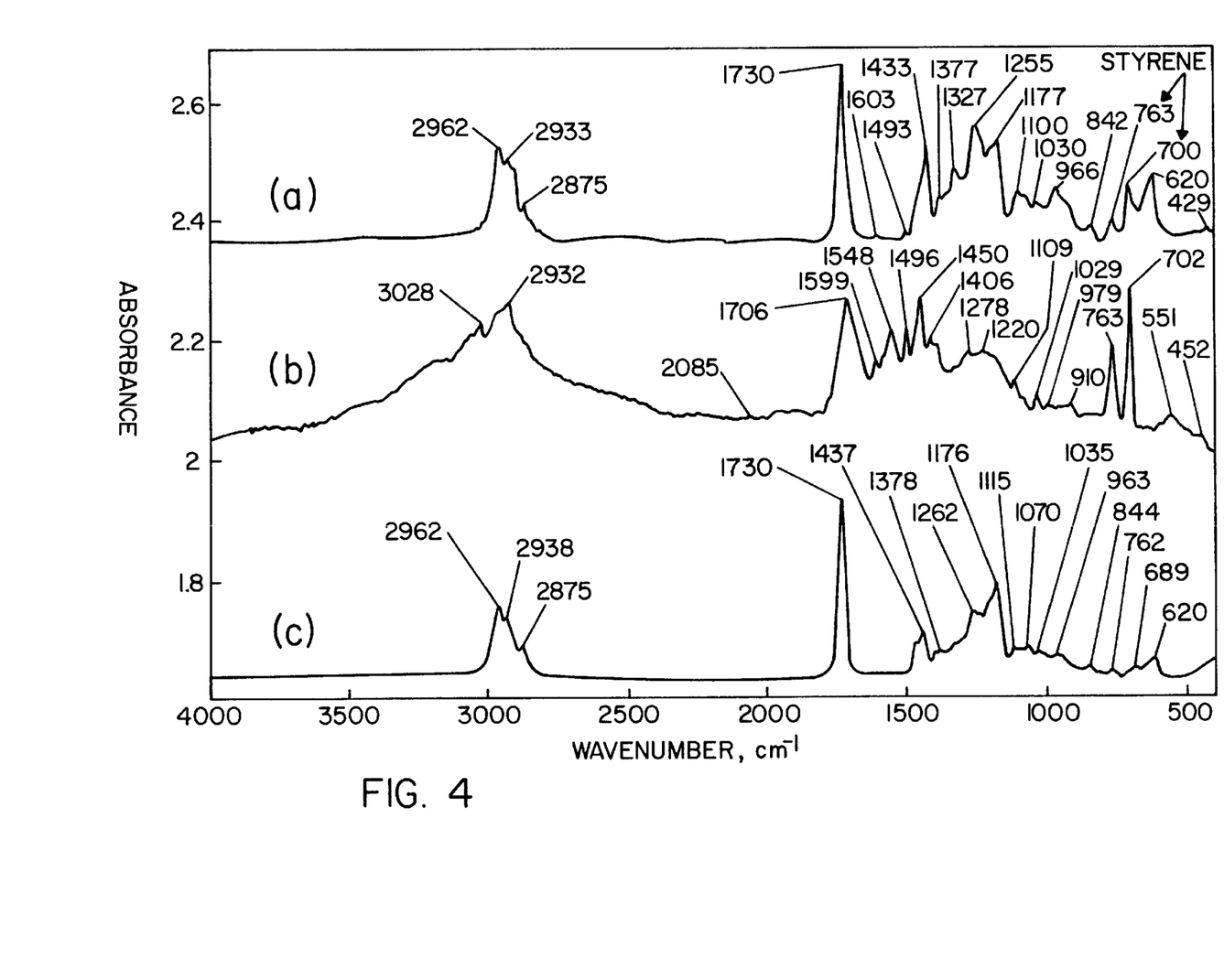
FIG. 4 is a series of IR spectra of the isolated PVC fraction containing graft copolymer (Example 7), the support resin, and a commercial vinyl chloride-n-butyl acrylate copolymer.

This conclusion is supported by the analysis of IR spectra shown on FIG. 4. Peaks at 763 and 702 $cm^{-1}$ are characteristic for the aromatic ring of styrene and are clearly observed in the spectra of both support resin (4b) and the isolated PVC fraction (4a). These peaks are absent from the spectrum of commercial vinyl chloride-n-butyl acrylate copolymer Vycar 460X47 (spectrum 4c).

NMR Spectroscopy

Figure 5:
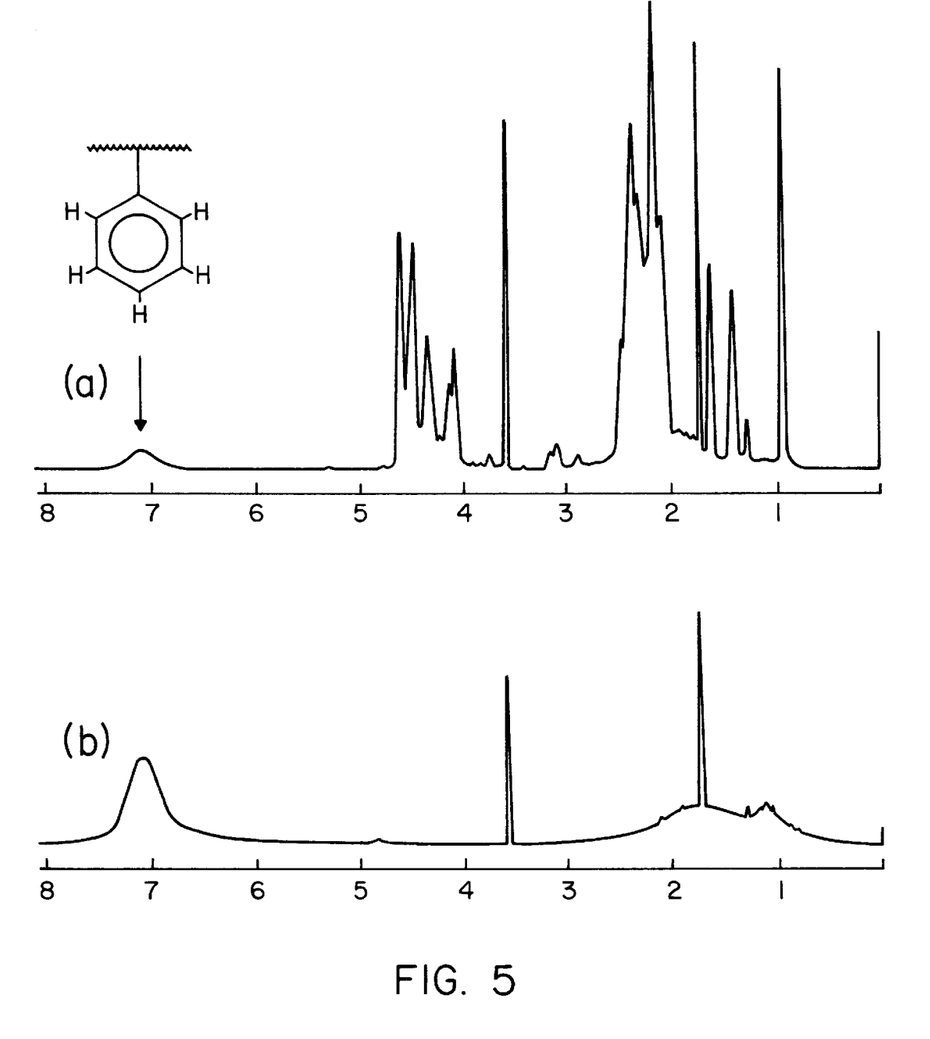
FIG. 5 is a series of $^1$H NMR spectra of the isolated PVC fraction (Example 7) and the support resin.

NMR spectroscopy allows for an accurate quantitative analysis of polymers. $^1H$ NMR spectra of the isolated PVC fraction and a virgin support resin are shown on FIG. 5. A resonance of aromatic protons at ~7 ppm can be used to determine a content of grafted support resin in PVC. Relative integral intensity of the aromatic proton region indicates that the isolated graft copolymer contains approximately 9% wt. of support resin. Since fractions enriched with support resin are more likely to be lost during fractionation and precipitation, the actual level of grafting is probably higher that 9%. Approximate integration of the GPC trace 1b indicates that about 20% of support resin was grafted with PVC in this particular experiment.

EXAMPLE 8

(Example using 70% Vinyl Chloride Composition and 30% n-butyl Acrylate)

Using the process of Example 1, supported latex was prepared with the use of the following components:

1-st stage (82° C., 2 hr.): 383 grams DM water, 53 grams 30% SLS, 5.6 grams SPS, 16 grams n-butyl acrylate, and 815 grams 32% Carboset™ GA 1160.

2-nd stage (57° C., 17 hr.): 120 grams DM water, 10.4 grams SPS, and 8.6 grams 28% aqua ammonia. Metered: 560 grams vinyl chloride, 224 grams n-butyl acrylate, and a mixture of 120 grams DM water and 10 grams 28% aqua ammonia. After polymerization completed, residual monomers were polymerized with the use of a residual monomer reduction package.

The latex obtained had pH=9.0 and 68 nm particle size. Glass-transition temperature of the vinyl chloride copolymer is 44° C.

EXAMPLE 9

(Example using 50% Vinyl Chloride Composition and 50% n-butyl Acrylate)

Using the process of Example 1, supported latex was prepared with the use of the following components:

1-st stage (82° C., 2 hr.): 525 grams DM water, 47 grams 30% SLS, 7 grams SPS, 14 grams n-butyl acrylate, and 713 grams 32% Carboset™ GA 1160.

2-nd stage (57° C., 18 hr.): 105 grams DM water, 10.5 grams SPS. Metered: 350 grams vinyl chloride and 336 grams n-butyl acrylate. After polymerization completed, residual monomers were polymerized with the use of a residual monomer reduction package.

The latex obtained had pH=7.7 and 52 nm particle size. Glass-transition temperature of the vinyl chloride copolymer is 20° C.

EXAMPLE 10

(Example using 70% Vinyl Chloride Monomers and 30% 2-ethylhexyl Acrylate Composition)

Using the process of Example 1, supported latex was prepared with the use of the following components:

1-st stage (82° C., 2 hr.): 383 grams DM water, 53 grams 30% SLS, 5.6 grams SPS, 16 grams n-butyl acrylate, and 815 grams 32% Carboset™ GA 1160.

2-nd stage (54° C., 12 hr.): 76 grams DM water and 19 grams APS. Metered: 665 grams vinyl chloride, 257 grams 2-ethylhexyl acrylate, and a mixture of 437 grams DM water and 7 grams 28% aqua ammonia. After polymerization completed, residual monomers were polymerized with the use of a residual monomer reduction package.

The latex obtained had pH=8.2, 95 nm particle size and 400 cP Brookfield viscosity. Glass-transition temperature of the vinyl chloride copolymer is 39° C.

EXAMPLES 11–13

(Example of Seed Formation at the Scavenging Step)

Using the process of Example 1, supported latex was prepared with the use of the following components:

1-st stage (82° C., 3 hr.): 57 grams DM water, 31.7 grams 30% SLS, 7.6 grams SPS, 9.5 grams n-butyl acrylate, 10 grams 28% aqua ammonia, and 968 grams 32% Carboset™ GA 1160.

2-nd stage (52° C., 14 hr.): 38 grams DM water and 19 grams ammonium. Metered: 808 grams vinyl chloride, 133 grams n-butyl acrylate, and a mixture of 370 grams DM water and 7 grams 28% aqua ammonia. After polymerization completed, residual monomers were polymerized with the use of a residual monomer reduction package.

Two more experiments were conducted under the same conditions with different amount of n-butyl acryl at the first stage. Results are summarized in the table below.

| n-BA g | Particle Size Nm |
| --- | --- |
| 9.5 | 150 |
| 19 | 121 |

-continued

| n-BA g | Particle Size Nm |
|--------|------------------|
| 28.5   | 108              |

The invention has been described with reference to preferred and alternate embodiments. Obviously, modifications and alterations will occur to others upon the reading and understanding of this specification. The specification is intended to include all such modifications and alterations insofar as they come within the scope of the appended claims or the equivalents thereof.

What is claimed is:

1. An emulsion polymer comprising a vinyl chloride (co)polymer and an alkali or water soluble aromatic support resin polymer, wherein said support polymer comprises at least one monomeric unit derived from an aromatic monomer, has essentially no traceable residual unreacted aromatic monomer, has no graft-polymerizable unsaturated group and is grafted with the vinyl chloride (co)polymer.

2. The emulsion polymer of claim 1 wherein the emulsion polymer is redispersible in water.

3. The emulsion polymer of claim 1 wherein the emulsion polymer has a particle diameter of about 20 to about 500 nm.

4. The emulsion polymer of claim 1 wherein the emulsion polymer has a particle diameter of about 50 to about 300 nm.

5. The emulsion polymer of claim 1 wherein the emulsion polymer has a viscosity from about 10 cP to about 10,000 cP.

6. The emulsion polymer of claim 1 wherein the emulsion polymer has from about 20 wt. % solids to about 65 wt. % solids.

7. The emulsion polymer of claim 1 wherein the vinyl chloride (co)polymer is comprised of from about 10 wt. % to about 100 wt. % vinyl chloride.

8. The emulsion polymer of claim 1 wherein the vinyl chloride copolymer further comprises one or more comonomers selected from the group consisting of methyl (meth) acrylate, ethyl (meth)acrylate, n-propyl (meth)acrylate, isopropyl (meth)acrylate, n-butyl (meth)acrylate, and 2-ethylhexyl (meth)acrylate.

9. The emulsion polymer of claim 1 wherein the support resin polymer which is free of residual monomer is a reaction product of a support resin polymer having at least one aromatic monomer and a chasing monomer.

10. The emulsion polymer of claim 1 wherein the aromatic monomer(s) is(are) of the formulae where n being an integer from 0 to 2; $R_1, R_2, R_3, R_4, R_5, R_6$, and $R_7$ are selected from the group consisting of H, $CH_3$, $C_mH_{2m+1}$, OH, $OCH_3$, $OC_mH_{2m+1}$, COOH, $COOCH_3$, $COOC_mH_{2m+1}$, Cl and Br, m being an integer from 2 to 9, and $R_8$ is selected from the group consisting of H, $CH_3$, $C_mH_{2m+1}$, and $C_6H_5$, m being an integer from 2 to 9.

11. The emulsion polymer of claim 7 wherein the support resin polymer further comprises a functional monomer(s) selected from the group consisting of acid-functional monomers, anhydride-functional monomers, salts thereof and a combination thereof.

12. The emulsion polymer of claim 1 wherein the support resin polymer is an alkali or water soluble polymer.

13. The emulsion polymer of claim 1 wherein the support resin polymer further comprises a functional monomer selected from the group consisting of acrylic acid, methacrylic acid, crotonic acid, vinylacetic acid, 2-acrylamido-2-methylpropanesulfonic acid, maleic acid, maleic anhydride, itaconic acid, mesaconic 5 acid, fumaric acid, citraconic acid, alkali metal salts thereof and amine or ammonium salts thereof.

14. The emulsion polymer of claim 1 wherein the support resin polymer further includes a monomer selected from the group consisting of methyl (meth)acrylate, ethyl (meth) acrylate, n-propyl (meth)acrylate, n-butyl (meth)acrylate, isopropyl (meth)acrylate, isobutyl (meth)acrylate, n-amyl (meth)acrylate, n-hexyl (meth)acrylate, isoamyl (meth) acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth)acrylate, trifluoroethyl (meth)acrylate, benzyl (meth)acrylate, 2-n-butoxyethyl (meth)acrylate, 2-chloroethyl (meth)acrylate, secbutyl-(meth)acrylate, tert-butyl (meth)acrylate, 2-ethylbutyl (meth)acrylate, cyclohexyl (meth)acrylate, cyclopentyl (meth)acrylate, 2-ethoxyethyl (meth)acrylate, hexofluoroisopropyl (meth)acrylate, 3-methoxybutyl (meth)acrylate, 2-methoxybutyl (meth)acrylate, 2-nitro-2-methylpropyl (meth)acrylate, n-octyl (meth)acrylate, 2-ethylhexyl (meth) acrylate, 2-phenoxyethyl (meth)acrylate, 2-phenylethyl (meth)acrylate, phenyl (meth)acrylate, tetrahydrofurfuryl (meth)acrylate, norbornyl (meth)acrylate, acrylamide and its derivatives, tetrahydropyranyl (meth)acrylate, isobutylene, diisobutylene, and tetraisobutylene.

15. A polymerization process for preparing an emulsion polymer comprising an aromatic support resin polymer grafted with a vinyl chloride (co)polymer, said process comprising the steps of:

(a) preparing a reaction mixture comprising a polymer which is essentially free of residual aromatic monomer, has no graft-polymerizable unsaturated group and has monomeric units derived from an aromatic monomer (s); and (b) (co)polymerizing the vinyl chloride in presence of the reaction mixture.

16. The polymerization process of claim 15 wherein the polymer of step (a) is formed by copolymerizing a chasing monomer with a residual aromatic monomer and/or aromatic unsaturation of support resin polymer.

17. The polymerization process of claim 15 wherein the support resin polymer is an alkali or water soluble polymer.

18. The polymerization process of claim 15 wherein the support resin polymer further comprises a functional monomer selected from the group consisting of acrylic acid, methacrylic acid, crotonic acid, vinylacetic acid, 2-acrylamido-2-methylpropanesulfonic acid, maleic acid, maleic anhydride, itaconic acid, mesaconic acid, fumaric acid, citraconic acid, alkali metal salts thereof and amine or ammonium salts thereof.

19. The polymerization process of claim 15 wherein the support resin polymer further includes a monomer selected from the group consisting of methyl (meth)acrylate, ethyl (meth)acrylate, n-propyl (meth)acrylate, n-butyl (meth) acrylate, isopropyl (meth)acrylate, isobutyl (meth)acrylate, n-amyl (meth)acrylate, n-hexyl (meth)acrylate, isoamyl (meth)acrylate, 2-hydroxyethyl (meth)acrylate, 2-hydroxypropyl (meth)acrylate, N,N-dimethylaminoethyl (meth)acrylate, N,N-diethylaminoethyl (meth)acrylate, t-butylaminoethyl (meth)acrylate, 2-sulfoethyl (meth) acrylate, trifluoroethyl (meth)acrylate, benzyl (meth) acrylate, 2-n-butoxyethyl (meth)acrylate, 2-chloroethyl (meth)acrylate, secbutyl-(meth)acrylate, tert-butyl (meth) acrylate, 2-ethylbutyl (meth)acrylate, cyclohexyl (meth) acrylate, cyclopentyl (meth)acrylate, 2-ethoxyethyl (meth) acrylate, hexofluoroisopropyl (meth)acrylate, 3-methoxybutyl (meth)acrylate, 2-methoxybutyl (meth) acrylate, 2-nitro-2-methylpropyl (meth)acrylate, n-octyl (meth)acrylate, 2-ethylhexyl (meth)acrylate, 2-phenoxyethyl (meth)acrylate, 2-phenylethyl (meth) acrylate, phenyl (meth)acrylate, tetrahydrofurfuryl (meth) acrylate, norbornyl (meth)acrylate, acrylamide and its derivatives, tetrahydropyranyl (meth)acrylate, isobutylene, diisobutylene, and tetraisobutylene.

20. The polymerization process of claim 15 wherein the chasing monomer is selected from the group consisting of acrylic and methacrylic esters.

21. The polymerization process of claim 15 wherein the chasing monomer is present in an amount of 0.3 to 20%.

22. The polymerization process of claim 15 wherein the step of polymerizing is carried out by adding an initiator to a reaction mixture comprising the support resin polymer having residual aromatic monomer and/or aromatic unsaturation in the polymer chain, the chasing monomer, and (optionally) surfactant.

23. The polymerization process of claim 15 wherein the step (a) of polymerizing is carried out at temperature from about 5° C. to about 100° C.

24. The polymerization process of claim 15 wherein the vinyl chloride (co)polymer is made in situ in the reaction mixture comprising support resin polymer which is free of residual monomer.

25. The polymerization process of claim 15 wherein step (b) is carried out at a temperature of about 5° C. to about 90° C.

26. The polymerization process of claim 15 wherein step (b) is carried out at a pressure of about 12 to about 140 psig.

27. The polymerization process of claim 15 wherein the vinyl chloride (co)polymer is in the form of a latex or powder.

28. The polymerization process of claim 15 wherein the vinyl chloride (co)polymer is comprised of from about 10 wt. % to about 100 wt. % vinyl chloride.

29. The polymerization process of claim 15 wherein the vinyl chloride (co)polymer further comprises one or more monomers selected from the group consisting of methyl (meth)acrylate, ethyl (meth)acrylate, n-propyl (meth) acrylate, isopropyl (meth)acrylate, n-butyl (meth)acrylate, and 2-ethylhexyl (meth)acrylate.

30. The polymerization process of claim 15 wherein the emulsion polymer is redispersible in water.

31. A supported vinyl chloride emulsion (co)polymer prepared by a process comprising the steps of:

reacting a first reaction mixture comprising at least one chasing monomer and a support resin comprising at least one aromatic monomer and at least one functional monomer, to form an polymer which is essentially free of residual aromatic monomer has no graft-polymerizable unsaturated group and has monomeric units derived from the aromatic monomer;

followed by (co)polymerizing vinyl chloride in a reaction mixture comprising the polymer which is free of residual monomer.

32. The emulsion polymer of claim 31 wherein the aromatic monomer(s) (is) are selected from the group consisting of styrene, alpha-methylstyrene, tertiary butylstyrene, ortho-, meta-, and para-methylstyrene, ortho-, meta- and para-ethylstyrene, o-methyl-p-iso-propylstyrene, p-chlorostyrene, p-bromostyrene, o,p-dichlorostyrene, o,p-dibromostyrene, ortho-, meta- and para-methoxystyrene, indene and its derivatives, vinylnaphthalene, diverse vinyl (alkyl-naphthalenes) and vinyl (halonaphthalenes) and mixtures thereof, acenaphthylene, diphenylethylene, vinylpyridine, and vinyl anthracene.

33. The emulsion polymer of claim 31 wherein the functional monomer is one selected from the group consisting of acrylic acid, methacrylic acid, crotonic acid, vinylacetic acid, 2-acrylamido-2-methylpropanesulfonic acid, maleic acid, maleic anhydride, itaconic acid, mesaconic acid, fumaric acid, citraconic acid, alkali metal salts thereof and amine or ammonium salts thereof.

34. The emulsion polymer of claim 31 wherein the chasing (scavenging) monomer is of the formula X—CH=CYZ where X is H, COOH; Y is H, CH$_3$, COOH, CH$_2$COOH; Z is COOH, COOCH$_3$, COOC$_n$H$_{2n+1}$, CONH (C$_n$H$_{2n+1}$), and CON(C$_n$H$_{2n+1}$)$_2$, where n=1 to 9.

35. The emulsion polymer of claim 31 wherein the aromatic monomer is of the formula where n being an integer from 0 to 2; $R_1, R_2, R_3, R_4, R_5, R_6$, and $R_7$ are selected from the group consisting of H, $CH_3$, $C_mH_{2m+1}$, OH, $OCH_3$, $OC_mH_{2m+1}$, COOH, $COOCH_3$, $COOCH_mH_{2m+1}$, Cl and Br, m being an integer from 2 to 9, and $R_8$ is selected from the group consisting of H, $CH_3$, $C_mH_{2m+1}$, and $C_6H_5$, m being an integer from 2 to 9.

36. The emulsion polymer of claim 31 wherein the emulsion polymer is redispersible in water.

37. The emulsion polymer of claim 31 wherein the emulsion polymer has a particle diameter of about 30 to about 500 nm.

38. The emulsion polymer of claim 31 wherein the emulsion polymer has a viscosity from about 10 to about 10000 cP.

39. The emulsion polymer of claim 31 wherein the emulsion polymer has from about 20 wt. % solids to about 65 wt. % solids.

40. The emulsion polymer of claim 31 wherein the vinyl chloride (co)polymer is comprised of from about 10 wt. % to about 100 wt. % vinyl chloride.

* * * * *